(12) United States Patent
Hirata et al.

(10) Patent No.: US 7,679,861 B2
(45) Date of Patent: Mar. 16, 2010

(54) MAGNETIC HEAD FOR PERPENDICULAR MAGNETIC RECORDING WITH CONTROLLED STATE OF MAGNETIZATION OF THE END FACE OF THE POLE LAYER

(75) Inventors: Kei Hirata, Tokyo (JP); Kiyoshi Noguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 674 days.

(21) Appl. No.: 11/591,504

(22) Filed: Nov. 2, 2006

(65) Prior Publication Data
US 2007/0139817 A1    Jun. 21, 2007

(30) Foreign Application Priority Data
Dec. 15, 2005    (JP)    ............... 2005-361166

(51) Int. Cl.
*G11B 5/31* (2006.01)
(52) U.S. Cl. .................................. 360/125.03
(58) Field of Classification Search ............ 360/125.03, 360/125.04, 125.06, 125.08, 125.12
See application file for complete search history.

(56) References Cited

U.S. PATENT DOCUMENTS

| | | | |
|---|---|---|---|
| 6,628,428 | B1 | 9/2003 | Ramakesavan |
| 6,628,478 | B2 | 9/2003 | Gill |
| 7,294,418 | B2 | 11/2007 | Ikeda et al. |
| 2004/0037002 | A1 * | 2/2004 | Kudo et al. ............. 360/125.06 |
| 2004/0150912 | A1 | 8/2004 | Kawato et al. |
| 2004/0184191 | A1 | 9/2004 | Ichihara et al. |
| 2005/0013044 | A1 | 1/2005 | Hirata et al. |
| 2005/0286170 | A1 | 12/2005 | Hirata et al. |
| 2007/0230044 | A1 * | 10/2007 | Han et al. ............. 360/125.04 |

FOREIGN PATENT DOCUMENTS

| | | |
|---|---|---|
| JP | A-2004-185742 | 7/2004 |
| JP | A 2004-281023 | 10/2004 |
| JP | A-2005-025890 | 1/2005 |
| JP | A 2005-038535 | 2/2005 |
| JP | A 2005-174449 | 6/2005 |
| JP | A 2006-012250 | 1/2006 |

OTHER PUBLICATIONS

Y. Zhou et al., "Pole-Tip Size Effect on Perpendicular Recording Head Remanence," Digests of Intermag 2005, DB04 2005, p. 394.

* cited by examiner

*Primary Examiner*—Craig A. Renner
(74) *Attorney, Agent, or Firm*—Oliff & Berridge, PLC (57) ABSTRACT

A pole layer incorporates a track width defining portion and a wide portion. The track width defining portion has an end face that is located in the medium facing surface and that defines the track width. The maximum width of the wide portion is greater than the track width and equal to or greater than the length of the wide portion taken in the direction orthogonal to the medium facing surface. When the coil is generating no magnetic field, in the end face of the track width defining portion, there exist first and second regions in which the directions of components of magnetization orthogonal to the medium facing surface are opposite.

10 Claims, 7 Drawing Sheets

MAGNETIC HEAD FOR PERPENDICULAR MAGNETIC RECORDING WITH CONTROLLED STATE OF MAGNETIZATION OF THE END FACE OF THE POLE LAYER

BACKGROUND OF THE INVENTION

1. Field of the Invention

The present invention relates to a magnetic head for perpendicular magnetic recording used for recording data on a recording medium by means of a perpendicular magnetic recording system, and to a head gimbal assembly, a head arm assembly, and a magnetic disk drive each of which incorporates the magnetic head for perpendicular magnetic recording.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

It is known that there are types of magnetic heads for perpendicular magnetic recording one of which is a single-pole head and another one of which is a shield-type head. The single-pole head comprises: a medium facing surface that faces toward a recording medium; a coil for generating a magnetic field corresponding to data to be written on the recording medium; a pole layer (main pole) having an end face located in the medium facing surface, allowing a magnetic flux corresponding to the field generated by the coil to pass therethrough, and generating a write magnetic field for writing the data on the recording medium by means of the perpendicular magnetic recording system; an auxiliary pole having an end face located in the medium facing surface and having a portion that is located away from the medium facing surface and coupled to the pole layer; and a gap layer made of a nonmagnetic material and provided between the pole layer and the auxiliary pole. In the medium facing surface the end face of the auxiliary pole is located backward or forward of the end face of the pole layer along the direction of travel of the recording medium. The auxiliary pole has a function of returning a magnetic flux that has been generated from the end face of the pole layer and has magnetized the recording medium.

The shield-type head comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium by means of the perpendicular magnetic recording system; a write shield layer having an end face located in the medium facing surface and having a portion that is located away from the medium facing surface and coupled to the pole layer; and a gap layer made of a nonmagnetic material and provided between the pole layer and the write shield layer. In the medium facing surface the end face of the write shield layer is located forward of the end face of the pole layer along the direction of travel of the recording medium with a specific small space created by the thickness of the gap layer. The end face of the write shield layer has a width greater than that of the end face of the pole layer. The end face of the write shield layer has an area greater than that of the end face of the pole layer. In the shield-type head the write shield layer is capable of making the magnetic field gradient abrupt by taking in the magnetic flux generated from the pole layer. As a result, the shield-type head is capable of further improving the linear recording density. The magnetic field gradient means an amount of change of components orthogonal to the surface of the recording medium among components of the magnetic field generated from the pole layer, the amount of change being taken per unit length along the direction of travel of the recording medium. The write shield layer also has a function of returning a magnetic flux that has been generated from the end face of the pole layer and has magnetized the recording medium.

In each of the single-pole head and the shield-type head, the pole layer incorporates a track width defining portion and a wide portion, for example. The track width defining portion has an end located in the medium facing surface, and defines the track width. The wide portion is coupled to the other end of the track width defining portion and has a width greater than the width of the track width defining portion. The width of the track width defining portion is nearly uniform. For example, the wide portion is equal in width to the track width defining portion at the interface with the track width defining portion, and gradually increases in width as the distance from the medium facing surface increases and then maintains a specific width to the end of the wide portion.

For the magnetic head to achieve higher recording density, particularly required are a reduction in track width, that is, a reduction in width of the end face of the pole layer located in the medium facing surface, and an improvement in write characteristics. However, if the track width is reduced, write characteristics such as an overwrite property that is a parameter indicating an overwriting capability are degraded. Therefore, it is required to achieve better write characteristics as the track width is reduced.

In a magnetic head for perpendicular magnetic recording, it is known that there sometimes occurs a phenomenon in which data stored on a recording medium is erased by a magnetic field produced by the pole layer due to remanent magnetization of the pole layer when writing is not performed. The phenomenon will be hereinafter called pole erase.

Techniques for suppressing an occurrence of pole erase are known, such as those disclosed in Japanese Published Patent Application (hereinafter referred to as 'JP-A') 2005-38535, JP-A 2005-174449, and JP-A 2004-281023.

Each of JP-A 2005-38535 and JP-A 2005-174449 discloses a technique in which a write pole film (a pole layer) includes a soft magnetic film and a magnetic bias film, and an occurrence of pole erase is suppressed by directing the magnetization of the soft magnetic film to the direction of track width by means of the magnetic bias film.

JP-A 2004-281023 discloses a technique in which a main pole (a pole layer) incorporates a multilayer magnetic film made up of high saturation flux density layers and low saturation flux density layers, and an occurrence of pole erase is suppressed by making the direction of magnetization of a pair of high saturation flux density layers antiparallel, the high saturation flux density layers being opposed to each other with one of the low saturation flux density layers disposed in between.

U.S. Pat. No. 6,628,478 B2 discloses a technique in which, in a magnetic head for a longitudinal magnetic recording system, each of first and second pole layers opposed to each other with a gap layer disposed in between is formed of a mutilayer film made up of ferromagnetic films and nonmagnetic metal films, and a pair of ferromagnetic films adjacent to each other with one of the nonmagnetic metal films disposed in between are antiferromagnetically coupled to each other. This technique reduces the number of magnetic domain walls in each of the pole layers, and improves the high frequency response of the magnetic head.

A fact that a great remanent magnetic field is created in a portion of a pole layer is disclosed in Y Zhou et al., 'POLE-TIP SIZE EFFECT ON PERPENDICULAR RECORDING HEAD REMANENCE', Digests of Intermag 2005, DB04, 2005.

A problem that the structure of the pole layer is complicated is found in each of the techniques disclosed in JP-A 2005-38535, JP-A 2005-174449, JP-A 2004-281023, and U.S. Pat. No. 6,628,478 B2.

According to the techniques disclosed in JP-A 2005-38535 and JP-A 2005-174449, since the pole layer includes the soft magnetic film and the magnetic bias film, the number of steps required for manufacturing the magnetic head is increased, and a variety of materials are required for the magnetic head. As a result, these techniques have problems of an increase in costs for manufacturing the magnetic head and a reduction in throughput.

According to the techniques disclosed in JP-A 2004-281023 and U.S. Pat. No. 6,628,478 B2, currently-available methods of forming the pole layer are limited to physical vapor deposition such as sputtering. Consequently, these techniques have problems that the manufacturing process of the magnetic head is complicated and that the yield of the magnetic head is thereby reduced.

The inventors of the present patent application have found that the state of magnetization in the end face of the pole layer when writing is not performed relates to pole erase. The paper of Zhou et al. mentioned above does not address the relationship between the state of magnetization in the end face of the pole layer when writing is not performed and pole erase.

OBJECT AND SUMMARY OF THE INVENTION

It is an object of the invention to provide a magnetic head for perpendicular magnetic recording that is capable of suppressing an occurrence of pole erase without making the structure of a pole layer complicated, and to provide a head gimbal assembly, a head arm assembly, and a magnetic disk drive each of which incorporates the magnetic head.

A magnetic head for perpendicular magnetic recording of the invention comprises: a medium facing surface that faces toward a recording medium; a coil for generating a magnetic field corresponding to data to be written on the recording medium; and a pole layer allowing a magnetic flux corresponding to the field generated by the coil to pass therethrough, and generating a write magnetic field for writing the data on the recording medium by means of a perpendicular magnetic recording system.

The pole layer incorporates a track width defining portion and a wide portion that is located away from the medium facing surface and coupled to the track width defining portion. The track width defining portion has an end face that is located in the medium facing surface and that defines a track width. The maximum width of the wide portion is greater than the track width and equal to or greater than the length of the wide portion taken in the direction orthogonal to the medium facing surface. When the coil is generating no magnetic field, in the end face of the track width defining portion, there exist a first region and a second region in which directions of components of magnetization orthogonal to the medium facing surface are opposite.

In the magnetic head for perpendicular magnetic recording of the invention, the maximum width of the wide portion is greater than the track width and equal to or greater than the length of the wide portion taken in the direction orthogonal to the medium facing surface. When the coil is generating no magnetic field, in the end face of the track width defining portion, there exist the first and second regions in which the directions of components of magnetization orthogonal to the medium facing surface are opposite. The magnetic head of the invention having such a configuration suppresses an occurrence of pole erase.

In the magnetic head of the invention, in the end face of the track width defining portion, there may further exist a third region that has no component of magnetization in the direction orthogonal to the medium facing surface.

In the magnetic head of the invention, each of the first and second regions may have an area that is equal to or smaller than two thirds of the area of the end face of the track width defining portion.

In the magnetic head of the invention, the track width may fall within a range of 0.05 to 0.15 μm inclusive, and the length of the track width defining portion taken in the direction orthogonal to the medium facing surface may fall within a range of 10 to 250 nm inclusive.

In the magnetic head of the invention, the magnetostriction constant of a material forming the pole layer may be greater than or equal to $10\times10^{-6}$ and smaller than $50\times10^{-6}$. The internal stress of the pole layer may be a tensile stress and may be greater than or equal to 200 MPa and smaller than or equal to 1000 MPa. The anisotropic magnetic field in the pole layer may be greater than or equal to 0 A/m and smaller than $30\times79.6$ A/m.

In the magnetic head of the invention, the magnetostriction constant of the material forming the pole layer may be greater than or equal to $10\times10^{-6}$ and smaller than $50\times10^{-6}$, the internal stress of the pole layer may be a tensile stress and may be greater than or equal to 200 MPa and smaller than or equal to 1000 MPa, and the anisotropic magnetic field in the pole layer may be greater than or equal to $30\times79.6$ A/m and smaller than or equal to $200\times79.6$ A/m.

In the magnetic head of the invention, the magnetostriction constant of the material forming the pole layer may be greater than or equal to zero and smaller than $15\times10^{-6}$, the internal stress of the pole layer may be a tensile stress and may be greater than or equal to 100 MPa and smaller than or equal to 1000 MPa, and the anisotropic magnetic field in the pole layer may be greater than or equal to 0 A/m and smaller than $30\times79.6$ A/m.

A head gimbal assembly of the invention comprises: a slider including the magnetic head for perpendicular magnetic recording of the invention and disposed to face toward a recording medium; and a suspension flexibly supporting the slider.

A head arm assembly of the invention comprises: a slider including the magnetic head for perpendicular magnetic recording of the invention and disposed to face toward a recording medium; a suspension flexibly supporting the slider; and an arm for making the slider travel across tracks of the recording medium, the suspension being attached to the arm.

A magnetic disk drive of the invention comprises: a slider including the magnetic head for perpendicular magnetic recording of the invention and disposed to face toward a recording medium that is driven to rotate; and an alignment device supporting the slider and aligning the slider with respect to the recording medium.

According to the invention, the maximum width of the wide portion of the pole layer is greater than the track width and equal to or greater than the length of the wide portion taken in the direction orthogonal to the medium facing surface. When the coil is generating no magnetic field, in the end face of the track width defining portion of the pole layer, there exist the first and second regions in which the directions of components of magnetization orthogonal to the medium facing surface are opposite. As a result, the invention makes it possible to suppress an occurrence of pole erase without making the structure of the pole layer complicated.

Other and further objects, features and advantages of the invention will appear more fully from the following description.

DETAILED DESCRIPTION OF THE PREFERRED EMBODIMENT

Figure 1:
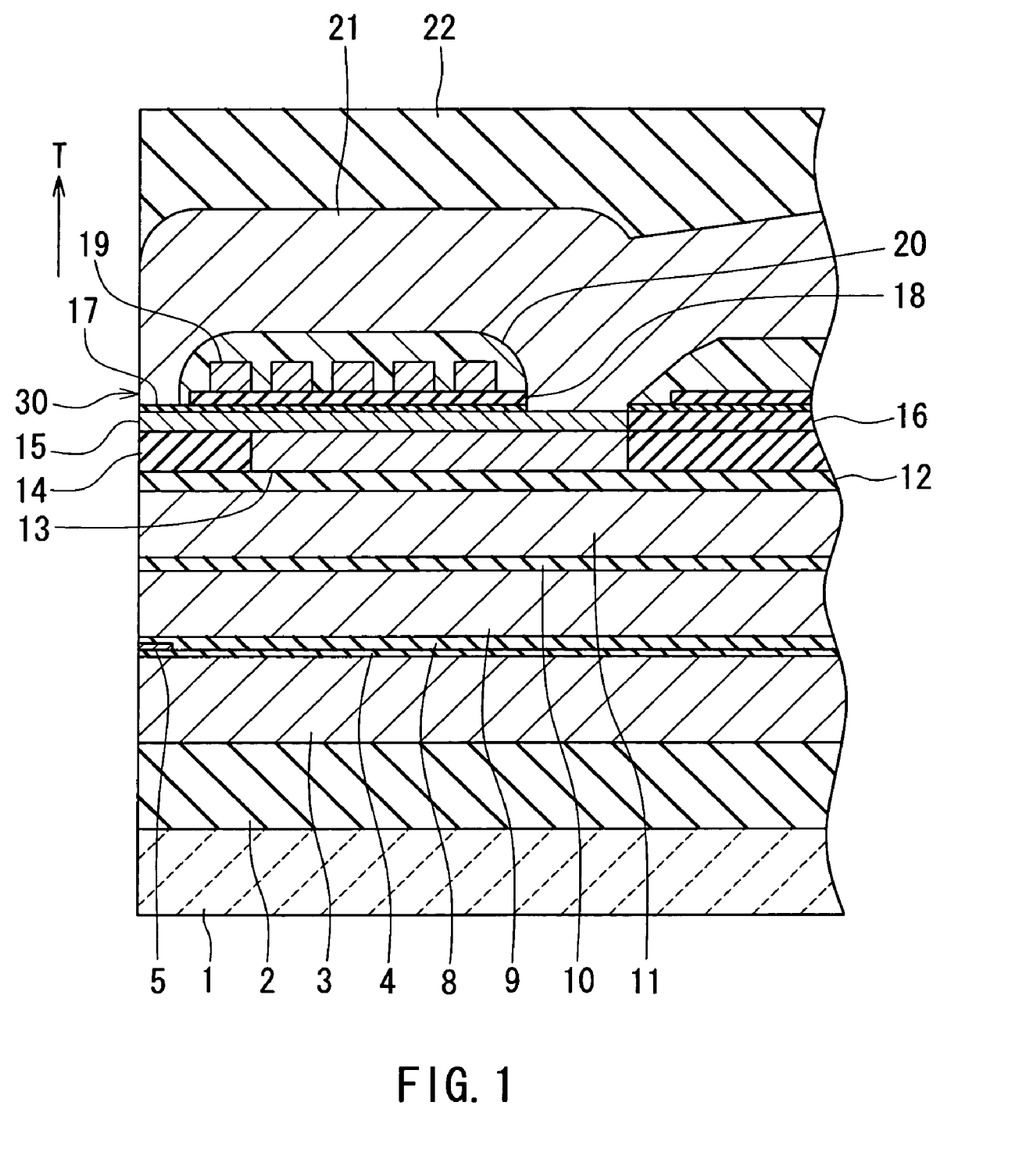
FIG. 1 is a cross-sectional view for illustrating the configuration of a magnetic head for perpendicular magnetic recording of an embodiment of the invention.
Figure 2:
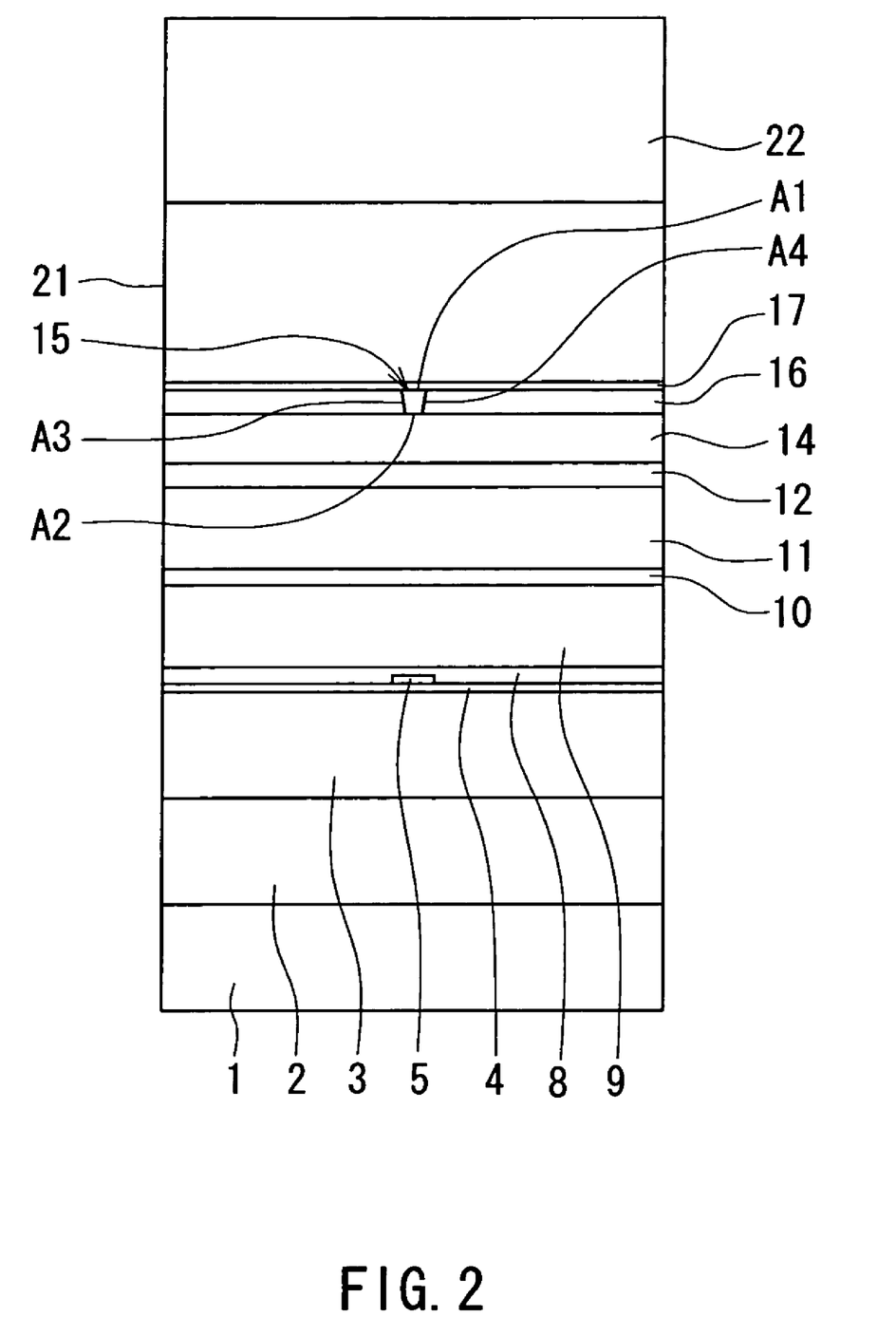
FIG. 2 is a front view of the medium facing surface of the magnetic head of FIG. 1.

A preferred embodiment of the invention will now be described in detail with reference to the accompanying drawings. Reference is now made to FIG. 1 and FIG. 2 to describe the configuration of a magnetic head for perpendicular magnetic recording of the embodiment of the invention. FIG. 1 is a cross-sectional view illustrating the configuration of the magnetic head of the embodiment. FIG. 2 is a front view illustrating a medium facing surface of the magnetic head of the embodiment. FIG. 1 illustrates a cross section orthogonal to the medium facing surface and a surface of a substrate. The arrow indicated with T in FIG. 1 shows the direction of travel of a recording medium.

As shown in FIG. 1 and FIG. 2, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a first read shield layer 3 made of a magnetic material and disposed on the insulating layer 2; an insulating layer 4 disposed on the first read shield layer 3; a magnetoresistive (MR) element 5 as a read element disposed on the insulating layer 4; an insulating layer 8 disposed to cover the MR element 5 and the insulating layer 4; and a second read shield layer 9 made of a magnetic material and disposed on the insulating layer 8.

The MR element 5 has an end that is located in a medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further comprises: a nonmagnetic layer 10 made of a nonmagnetic material such as alumina and disposed on the second read shield layer 9; and a middle magnetic layer 11 made of a magnetic material and disposed on the nonmagnetic layer 10. The portions from the first read shield layer 3 to the middle magnetic layer 11 make up a read head. The middle magnetic layer 11 has a function of a read shield layer and a function of an auxiliary pole of a write head that will be described later.

The magnetic head further comprises: a nonmagnetic layer 12 made of a nonmagnetic material such as alumina and disposed on the middle magnetic layer 11; a yoke layer 13 made of a magnetic material and disposed on the nonmagnetic layer 12; and a nonmagnetic layer 14 made of a nonconductive and nonmagnetic material such as alumina and disposed around the yoke layer 13. An end of the yoke layer 13 closer to the medium facing surface 30 is located at a distance from the medium facing surface 30. The yoke layer 13 and the nonmagnetic layer 14 have flattened top surfaces.

The magnetic head further comprises: a pole layer 15 made of a magnetic material and disposed on the top surfaces of the yoke layer 13 and the nonmagnetic layer 14; and a nonmagnetic layer 16 made of a nonconductive and nonmagnetic material such as alumina and disposed around the pole layer 15. A bottom surface of the pole layer 15 touches the top surface of the yoke layer 13. The pole layer 15 and the nonmagnetic layer 16 have flattened top surfaces.

The magnetic head further comprises: a gap layer 17 disposed on the pole layer 15 and the nonmagnetic layer 16; a nonmagnetic layer 18 made of a nonconductive and nonmagnetic material such as alumina and formed on a region of the gap layer 17 where a coil 19 described later will be disposed; the coil 19 disposed on the nonmagnetic layer 18; and an insulating layer 20 formed to cover the coil 19. The coil 19 is flat-whorl-shaped. The gap layer 17 has an opening located in a region corresponding to the center of the coil 19. The insulating layer 20 is not exposed in the medium facing surface 30. The gap layer 17 may be a nonmagnetic conductive layer.

The magnetic head further comprises a write shield layer 21 made of a magnetic material and disposed on the pole layer 15, the gap layer 17 and the insulating layer 20. The write shield layer 21 is coupled to the pole layer 15 through the opening of the gap layer 17. An end of the write shield layer 21 closer to the medium facing surface 30 is located in the medium facing surface 30. The portions from the nonmagnetic layer 12 to the write shield layer 21 make up a write head.

The magnetic head further comprises a protection layer 22 made of an insulating material such as alumina and formed to cover the write shield layer 21.

As described so far, the magnetic head of the embodiment comprises the medium facing surface 30 that faces toward a recording medium, the read head and the write head. The read head is disposed backward in the direction T of travel of the recording medium (that is, closer to the air inflow end of the slider). The write head is disposed forward in the direction T of travel of the recording medium (that is, closer to the air outflow end of the slider). The magnetic head writes data on the recording medium through the use of the write head and reads data stored on the medium through the use of the read head.

The read head comprises: the MR element 5 as a read element; and the first read shield layer 3 and the second read shield layer 9 for shielding the MR element 5. The MR element 5 is disposed near the medium facing surface 30 and reads data written on the recording medium by means of the perpendicular magnetic recording system.

The write head comprises the pole layer 15, the gap layer 17, the coil 19, and the write shield layer 21. The coil 19 generates a magnetic field corresponding to data to be written on the recording medium. The pole layer 15 has an end face located in the medium facing surface 30. The pole layer 15 allows a magnetic flux corresponding to the field generated by the coil 19 to pass therethrough and generates a write magnetic field for writing data on the medium by using the perpendicular magnetic recording system. The write shield layer 21 has an end face located in the medium facing surface 30. A portion of the write shield layer 21 located away from the medium facing surface 30 is coupled to the pole layer 15. The gap layer 17 has an end face located in the medium facing surface 30, and is provided between the pole layer 15 and the write shield layer 21.

At least part of the coil 19 is disposed between the pole layer 15 and the write shield layer 21 and insulated from the pole layer 15 and the write shield layer 21. The pole layer 15, the yoke layer 13 and the write shield layer 21 form a magnetic path that allows the magnetic flux corresponding to the magnetic field generated by the coil 19 to pass.

In the medium facing surface 30, the end face of the write shield layer 21 is located forward of the end face of the pole layer 15 in the direction of travel T of the recording medium (that is, closer to the air outflow end of the slider) with a specific space created by the thickness of the gap layer 17. The end face of the write shield layer 21 has a width greater than that of the end face of the pole layer 15. The end face of the write shield layer 21 has an area greater than that of the end face of the pole layer 15. The write shield layer 21 is capable of making the magnetic field gradient abrupt by taking in the magnetic flux generated from the end face of the pole layer 15. In addition, the write shield layer 21 has a function of returning the magnetic flux that has been generated from the end face of the pole layer 15 and that has magnetized the recording medium. Furthermore, the write shield layer 21 takes in unwanted expanding components of the returning flux generated from the end face of the pole layer 15 before the components reach the recording medium, and thereby functions as a magnetic shield.

Figure 3:
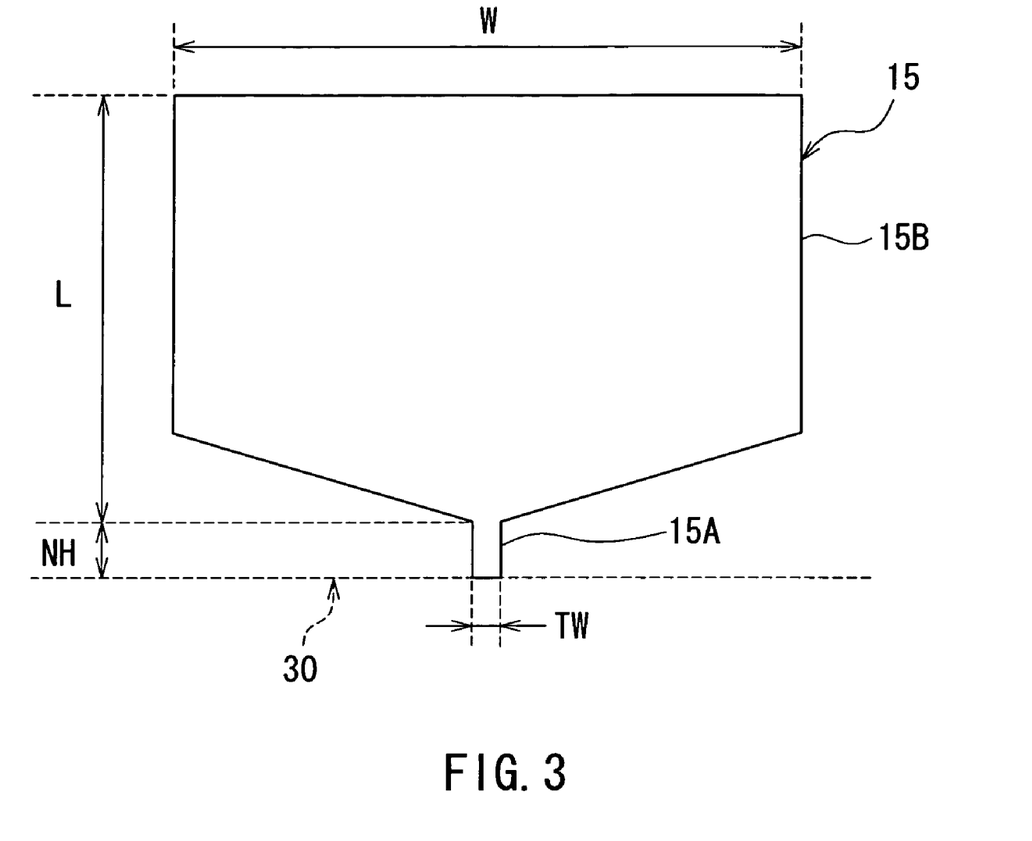
FIG. 3 is a top view of the pole layer of the magnetic head of FIG. 1.

Reference is now made to FIG. 3 to describe the shape of the pole layer 15 in detail. FIG. 3 is a top view of the pole layer 15. As shown in FIG. 3, the pole layer 15 incorporates a track width defining portion 15A and a wide portion 15B that is located away from the medium facing surface 30 and coupled to the track width defining portion 15A. The track width defining portion 15A has an end face that is located in the medium facing surface 30 and that defines a track width TW. The top surface of the track width defining portion 15A has a nearly uniform width. For example, the wide portion 15B is equal in width to the track width defining portion 15A at the interface with the track width defining portion 15A, and gradually increases in width as the distance from the medium facing surface 30 increases and then maintains a specific width to the end of the wide portion 15B. A maximum width W of the wide portion 15B is greater than the track width TW and equal to or greater than a length L of the wide portion 15B taken in the direction orthogonal to the medium facing surface 30. That is, the value of W/L is greater than 1.

The track width TW preferably falls within a range of 0.05 to 0.15 μm inclusive. A length NH of the track width defining portion 15A taken in the direction orthogonal to the medium facing surface 30 (which is hereinafter called a neck height) preferably falls within a range of 10 to 250 nm inclusive.

As shown in FIG. 2, the end face of the pole layer 15 (the track width defining portion 15A) located in the medium facing surface 30 has a shape of trapezoid that has: a first side A1 farthest from the substrate 1; a second side A2 opposite to the first side A1; a third side A3 connecting an end of the first side A1 to an end of the second side A2; and a fourth side A4 connecting the other end of the first side A1 to the other end of the second side A2. The first side A1 defines the track width. The width of the end face of the pole layer 15 decreases as the distance from the second side A2 decreases, that is, as the distance from the substrate 1 decreases. As a result, it is possible to suppress a phenomenon in which, when data is written on a specific track, data stored on an adjacent track is erased because of a skew. The skew is a tilt of the magnetic head with respect to the tangent of the circular track of a circular-plate-shaped recording medium. The end face of the pole layer 15 may be rectangle-shaped or square-shaped. Alternatively, the end face of the pole layer 15 may have a shape of a triangle without the second side A2. The thickness of the pole layer 15 taken in the medium facing surface 30 is preferably equal to or greater than 0.1 μm and equal to or smaller than 0.4 μm. If the thickness of the pole layer 15 is smaller than 0.1 μm, it is difficult to produce a sufficient write magnetic field from the end face of the pole layer 15. On the other hand, if the thickness of the pole layer 15 is greater than 0.4 μm, the widths of regions in which data is erased because of the skew are increased on both sides of the track on which writing or reading is performed. It is therefore difficult to increase the track density.

A variety of modifications of the magnetic head of the embodiment are possible, as will now be described. First, it is not absolutely necessary to provide the yoke layer 13. Alternatively, the yoke layer 13 may be provided on the top of the pole layer 15 or may be provided on the top and at the bottom of the pole layer 15. Furthermore, in place of the flat-whorl-shaped coil 19, a coil wound around the pole layer 15 in a helical manner may be provided. Alternatively, flat-whorl-shaped coils may be provided on the top and at the bottom of the pole layer 15, respectively. The write shield layer 21 may be made up of two or more layers.

A recording medium used in a magnetic disk drive incorporating the magnetic head of the embodiment may comprise a substrate, and a horizontally magnetized layer and a perpendicularly magnetized layer that are stacked on the substrate in this order. The perpendicularly magnetized layer is one in which data is stored. The horizontally magnetized layer is one that forms a magnetic path through which a magnetic flux passes.

A method of manufacturing the magnetic head of the embodiment will now be described. In this method, first, the insulating layer 2 and the first read shield layer 3 are formed one by one on the substrate 1. Next, the insulating layer 4, the MR element 5 and the insulating layer 8 are formed one by one on the first read shield layer 3. Next, the second read shield layer 9 is formed on the insulating layer 8. Next, the nonmagnetic layer 10, the middle magnetic layer 11 and the nonmagnetic layer 12 are formed one by one on the second read shield layer 9.

Next, the yoke layer 13 is formed on the nonmagnetic layer 12. Next, the nonmagnetic layer 14 is formed to cover the yoke layer 13. The nonmagnetic layer 14 is then polished by chemical mechanical polishing (CMP), for example, so that the top surface of the yoke layer 13 is exposed. The top surfaces of the yoke layer 13 and the nonmagnetic layer 14 are thereby flattened.

Next, the pole layer 15 is formed on the top surfaces of the yoke layer 13 and the nonmagnetic layer 14. Next, the nonmagnetic layer 16 is formed to cover the pole layer 15. The nonmagnetic layer 16 is then polished by CMP, for example, so that the top surface of the pole layer 15 is exposed. The top surfaces of the pole layer 15 and the nonmagnetic layer 16 are thereby flattened.

Next, the gap layer 17 and the nonmagnetic layer 18 are formed one by one on the pole layer 15 and the nonmagnetic layer 16. Next, the coil 19 is formed on the nonmagnetic layer 18. Next, the insulating layer 20 is formed to cover the coil 19. Next, the write shield layer 21 is formed on the pole layer 15, the gap layer 17 and the insulating layer 20. Next, the protection layer 22 is formed to cover the write shield layer 21.

Wiring and terminals are then formed on the protection layer 22, the substrate is cut into sliders, and the steps including polishing of the medium facing surface 30 and fabrication of flying rails are performed. The magnetic head is thus completed.

The features of the magnetic head of the embodiment will now be described. In the magnetic head of the embodiment, when writing is not performed, that is, when the coil 19 is not generating any magnetic field, in the end face of the track width defining portion 15A located in the medium facing surface 30, there exist a first region and a second region in which the directions of components of magnetization orthogonal to the medium facing surface 30 are opposite. When the coil 19 is not generating any magnetic field, in the end face of the track width defining portion 15A, there may further exist a third region that has no component of magnetization in the direction orthogonal to the medium facing surface 30. It is preferred that each of the first and second regions has an area that is equal to or smaller than two thirds of the area of the end face of the track width defining portion 15A.

Reference is now made to FIG. 8 to FIG. 11 to describe first to fourth examples of state of magnetization in the end face of the track width defining portion 15A that satisfies the above-mentioned requirement. FIG. 8 to FIG. 11 illustrate the first to fourth examples of state of magnetization in the end face of the track width defining portion 15A. FIG. 8 to FIG. 11 each illustrate the state of magnetization in the end face of the track width defining portion 15A when the coil 19 is not generating any magnetic field. In FIG. 8 to FIG. 11 the regions with '+' indicate the first region, the regions with '−' indicate the second region, and the regions with '0' indicate the third region.

Figure 8:
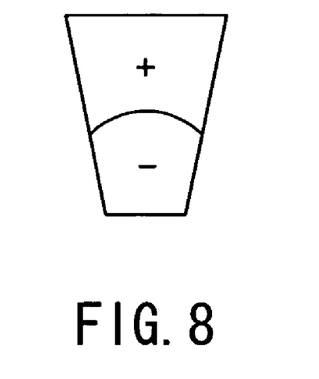
FIG. 8 is a view for illustrating a first example of a state of magnetization in an end face of a track width defining portion.

In the first example shown in FIG. 8, the first and second regions only exist in the end face of the track width defining portion 15A. In the first example the area of each of the first and second regions is equal to or smaller than two thirds of the area of the end face of the track width defining portion 15A. A case in which the locations of the first and second regions are the reverse of the ones shown in FIG. 8 is equivalent to the first example.

Figure 9:
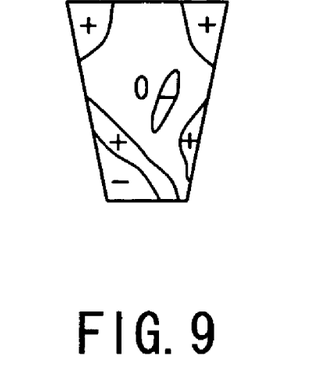
FIG. 9 is a view for illustrating a second example of a state of magnetization in the end face of the track width defining portion.

In the second example shown in FIG. 9, the first to third regions exist in the end face of the track width defining portion 15A. In the second example the area of each of the first and second regions is equal to or smaller than two thirds of the area of the end face of the track width defining portion 15A. In the second example the area of the third region is the greatest among the areas of the first to third regions. A case in which the locations of the first and second regions are the reverse of the ones shown in FIG. 9 is equivalent to the second example.

Figure 10:
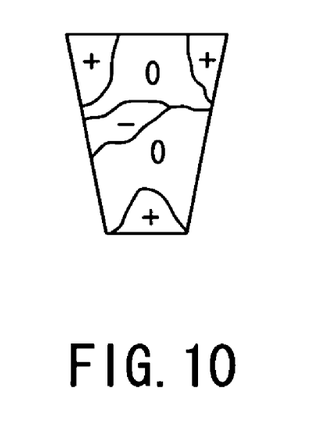
FIG. 10 is a view for illustrating a third example of a state of magnetization in the end face of the track width defining portion.

In the third example shown in FIG. 10, the first to third regions exist in the end face of the track width defining portion 15A. In the third example the area of each of the first and second regions is equal to or smaller than two thirds of the area of the end face of the track width defining portion 15A. In the third example, as in the second example, the area of the third region is the greatest among the areas of the first to third regions. A case in which the locations of the first and second regions are the reverse of the ones shown in FIG. 10 is equivalent to the third example.

Figure 11:
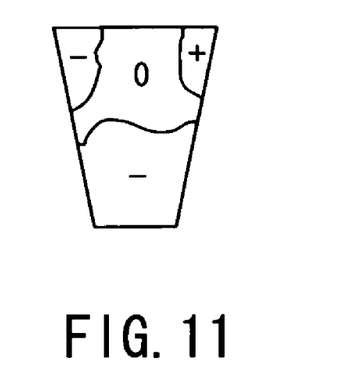
FIG. 11 is a view for illustrating a fourth example of a state of magnetization in the end face of the track width defining portion.

In the fourth example shown in FIG. 11, the first to third regions exist in the end face of the track width defining portion 15A. In the fourth example the area of each of the first and second regions is equal to or smaller than two thirds of the area of the end face of the track width defining portion 15A. In the fourth example the second and third regions occupy a most part of the end face of the track width defining portion 15A. A case in which the locations of the first and second regions are the reverse of the ones shown in FIG. 11 is equivalent to the fourth example.

Figure 12:
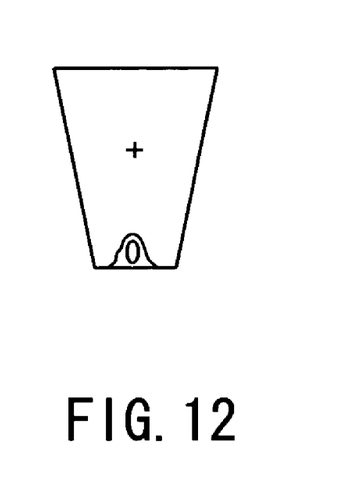
FIG. 12 is a view for illustrating a fifth example of a state of magnetization in the end face of the track width defining portion.
Figure 13:
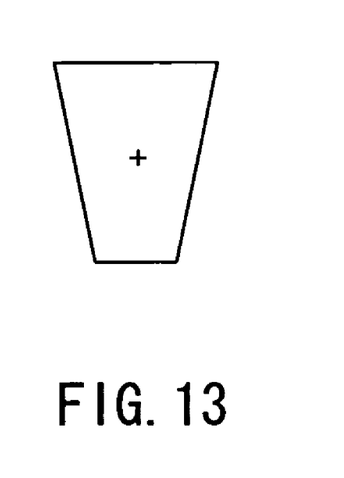
FIG. 13 is a view for illustrating a sixth example of a state of magnetization in the end face of the track width defining portion.

Next, FIG. 12 and FIG. 13 illustrate fifth and sixth examples as examples of state of magnetization in the end face of the track width defining portion 15A that does not satisfy the requirement of the embodiment. FIG. 12 and FIG. 13 respectively illustrate the fifth and sixth examples of state of magnetization in the end face of the track width defining portion 15A. FIG. 12 and FIG. 13 each illustrate the state of magnetization in the end face of the track width defining portion 15A when the coil 19 is not generating any magnetic field. The meanings of the signs shown in FIG. 12 and FIG. 13 are the same as those mentioned above.

In the fifth example shown in FIG. 12, the first region occupies a most part of the end face of the track width defining portion 15A. In the fifth example, a small third region exists in the end face of the track width defining portion 15A, in addition to the first region. In the fifth example the area of the first region is greater than two thirds of the area of the end face of the track width defining portion 15A. A case in which the second region exists in FIG. 12 in place of the first region is equivalent to the fifth example.

In the sixth example shown in FIG. 13, the first region only exists in the end face of the track width defining portion 15A.

A case in which the second region exists in FIG. 13 in place of the first region is equivalent to the sixth example.

According to the prior art, it is assumed that, in the pole layer of a magnetic head for perpendicular magnetic recording, because of a great shape anisotropy, a single region in which the directions of components of magnetization orthogonal to the medium facing surface are the same occupies a most part of the end face of the track width defining portion as in the fifth or sixth example when the coil is generating no magnetic field.

The inventors of the present patent application examined the relationship between pole erase and the state of magnetization in the end face of the track width defining portion 15A when the coil 19 is generating no magnetic field, and found the following. First, pole erase is likely to occur if a single region in which the directions of components of magnetization orthogonal to the medium facing surface 30 are the same occupies a most part of the end face of the track width defining portion 15A as in the fifth or sixth example when the coil 19 is generating no magnetic field. In contrast, the occurrence of pole erase is suppressed if the first and second regions exist in the end face of the track width defining portion 15A as in the first to fourth examples when the coil 19 is generating no magnetic field. Furthermore, the occurrence of pole erase is further suppressed if the area of each of the first and second regions is equal to or smaller than two thirds of the area of the end face of the track width defining portion 15A. That is, the inventors found that the occurrence of pole erase is suppressed if the state of magnetization in the end face of the track width defining portion 15A satisfies the requirement defined in the embodiment when the coil 19 is generating no magnetic field.

It is assumed that the reason why the occurrence of pole erase is suppressed when the first and second regions exist in the end face of the track width defining portion 15A is that the magnitude of components of magnetization in the direction orthogonal to the medium facing surface 30 is reduced as seen in the entire end face of the track width defining portion 15A. In addition, it is assumed that, when the area of each of the first and second regions is equal to or smaller than two thirds of the area of the end face of the track width defining portion 15A, the magnitude of components of magnetization in the direction orthogonal to the medium facing surface 30 is greatly reduced in the entire end face of the track width defining portion 15A, so that the occurrence of pole erase is further suppressed. From the foregoing, according to the embodiment, it is possible to suppress the occurrence of pole erase without making the structure of the pole layer 15 complicated.

Furthermore, the researches made by the inventors showed that the state of magnetization in the end face of the track width defining portion 15A when the coil 19 is generating no magnetic field is controllable by controlling the magnetostriction constant of the material forming the pole layer 15, the internal stress of the pole layer 15, and the anisotropic magnetic field in the pole layer 15.

The following are descriptions of first to third conditions that make it possible to achieve the state in which the first and second regions exist in the end face of the track width defining portion 15A and in which the area of each of the first and second regions is equal to or smaller than two thirds of the area of the end face of the track width defining portion 15A.

The first condition makes it possible to achieve the state in which, as in the first example, the first and second regions only exist in the end face of the track width defining portion 15A and in which the area of each of the first and second regions is equal to or smaller than two thirds of the area of the end face of the track width defining portion 15A. The first condition is that the magnetostriction constant of the material forming the pole layer 15 is equal to or greater than $10 \times 10^{-6}$ and smaller than $50 \times 10^{-6}$, the internal stress of the pole layer 15 is a tensile stress that is greater than or equal to 200 MPa and smaller than or equal to 1000 MPa, and the anisotropic magnetic field in the pole layer 15 is greater than or equal to 0 A/m and smaller than $30 \times 79.6$ A/m.

The second condition makes it possible to achieve the state in which, as in the second or third example, the first to third regions exist in the end face of the track width defining portion 15A and in which the area of each of the first and second regions is equal to or smaller than two thirds of the area of the end face of the track width defining portion 15A, the third region having the largest area among the first to third regions. The second condition is that the magnetostriction constant of the material forming the pole layer 15 is greater than or equal to $10 \times 10^{-6}$ and smaller than $50 \times 10^{-6}$, the internal stress of the pole layer 15 is a tensile stress that is greater than or equal to 200 MPa and smaller than or equal to 1000 MPa, and the anisotropic magnetic field in the pole layer 15 is greater than or equal to $30 \times 79.6$ A/m and smaller than or equal to $200 \times 79.6$ A/m.

The third condition makes it possible to achieve the state in which, as in the fourth example, the first to third regions exist in the end face of the track width defining portion 15A and in which the area of each of the first and second regions is equal to or smaller than two thirds of the area of the end face of the track width defining portion 15A, the third region and one of the first and second regions occupying a most part of the end face of the track width defining portion 15A. The third condition is that the magnetostriction constant of the material forming the pole layer 15 is greater than or equal to zero and smaller than $15 \times 10^{-6}$, the internal stress of the pole layer 15 is a tensile stress that is equal to or greater than 100 MPa and smaller than or equal to 1000 MPa, and the anisotropic magnetic field in the pole layer 15 is greater than or equal to 0 A/m and smaller than $30 \times 79.6$ A/m.

There is a possibility that the state of magnetization in the end face of the track width defining portion 15A when the coil 19 is generating no magnetic field can be such one as the first or fourth example in the overlap range between the first and third conditions, that is, when the magnetostriction constant of the material forming the pole layer 15 is equal to or greater than $10 \times 10^{-6}$ and smaller than $15 \times 10^{-6}$, the internal stress of the pole layer 15 is a tensile stress that is greater than or equal to 200 MPa and smaller than or equal to 1000 MPa, and the anisotropic magnetic field in the pole layer 15 is greater than or equal to 0 A/m and smaller than $30 \times 79.6$ A/m.

If any of the foregoing first to third conditions is selectively satisfied, it is possible to obtain the state of magnetization in the end face of the track width defining portion 15A that satisfies the requirement defined in the embodiment. The magnetostriction constant of the material forming the pole layer 15 can be controlled by the composition of the material forming the pole layer 15. The internal stress of the pole layer 15 can be controlled by the composition of the material forming the pole layer 15 or by the method of forming the pole layer 15. The anisotropic magnetic field in the pole layer 15 can be controlled by the composition of the material forming the pole layer 15, by the method of forming the pole layer 15, or by the shape of the pole layer 15.

In the embodiment, the maximum width W of the wide portion 15B of the pole layer 15 is greater than the track width TW and equal to or greater than the length L of the wide portion 15B taken in the direction orthogonal to the medium facing surface 30. The reasons for such definitions of the embodiment are shown below. First, it is necessary that the width W be greater than the track width TW so as to allow a sufficient magnetic flux for writing to pass through the pole layer 15. Next, it is necessary that the width W be equal to or greater than the length L so as to stabilize the domain structure of the wide portion 15B.

In the embodiment, the track width TW preferably falls within a range of 0.05 to 0.15 µm inclusive, and the neck height NH preferably falls within a range of 10 to 250 nm inclusive. The reasons will now be described. First, if the track width TW is smaller than 0.05 µm, the effect of shape anisotropy of the track width defining portion 15A is dominant with regard to the state of magnetization in the track width defining portion 15A, and it is difficult to control the state of magnetization in the end face of the track width defining portion 15A when the coil 19 is generating no magnetic field. Furthermore, in cases other than the case in which the track width TW is equal to or smaller than 0.15 µm and the neck height NH falls within a range of 10 to 250 nm inclusive, pole erase will hardly occur and therefore there will not be a specific advantage provided by the requirement defined in the embodiment relating to the state of magnetization in the end face of the track width defining portion 15A.

Results of an experiment performed for confirming the effect of the magnetic head of the embodiment will now be described. The experiment was performed on samples of magnetic heads of Examples 1 to 5 of the embodiment and References 1 and 2 to determine the magnetostriction constant of the material forming the pole layer 15, the internal stress of the pole layer 15, the anisotropic magnetic field in the pole layer 15, the state of magnetization in the end face of the track width defining portion 15A, and the normalized signal intensity obtained as a result of a pole erase test.

In the experiment, the state of magnetization in the end face of the track width defining portion 15A was determined in the following manner. A magnetic distribution in the end face of the track width defining portion 15A was observed by using a magnetic force microscope. The Dimension 3000 (a product name) manufactured by Veeco Instruments Inc. was used as the magnetic force microscope. The MESP (a product name) was used as a probe. The measurement was performed in the phase mode. In the experiment, in the end face of the track width defining portion 15A, a region in which a repulsive force was exerted on the probe was defined as the first region (the regions with '+' in FIG. 8 to FIG. 13), a region in which a gravitational force was exerted on the probe was defined as the second region (the regions with '−' in FIG. 8 to FIG. 13), and a region in which neither repulsive force nor gravitational force was exerted on the probe was defined as the third region (the regions with '0' in FIG. 8 to FIG. 13).

Descriptions will now be made as to the normalized signal intensity obtained as a result of a pole erase test. In the pole erase test, first, a single track on a recording medium was divided into 70 sectors, and a high frequency (160 MHz) signal was written on each of the sectors of the single track. Next, the high frequency signal was read from each of the sectors and a mean value of the read output signals obtained was determined for each of the sectors. This value is called an initial signal output. Next, a low frequency (1 MHz) signal was written over a front-end portion of each of the sectors. Next, the high frequency signal was read from a portion of each of the sectors other than the front-end portion, and a mean value of the read output signals obtained was determined for each of the sectors. This value is called a residual signal output. The ratio of the residual signal output to the initial signal output expressed in percent was defined as the normalized signal intensity.

The compositions of the materials forming the pole layer 15 in Examples 1 to 5 of the embodiment and References 1 and 2 were as follows. The composition in Example 1 was 65 weight % Fe, 30 weight % Co, and 5 weight % Ni. The composition in Example 2 was 95 weight % FeCo (70 weight % Fe and 30 weight % Co) and 5 weight % $ZrO_2$. The composition in Example 3 was 70 weight % Fe and 30 weight % Co. The composition in Example 4 was 67 weight % Co, 18 weight % Fe, and 15 weight % Ni. The composition in Example 5 was 95 weight % Fe and 5 weight % Ni. The composition in Reference 1 was 65 weight % Fe, 30 weight % Co, and 5 weight % Ni. The composition in Reference 2 was 70 weight % Fe and 30 weight % Co.

The table below shows the results of measurement for the magnetic head samples of Examples 1 to 5 of the embodiment and References 1 and 2. In the table 'magnetostriction constant' indicates the magnetostriction constant of the material forming the pole layer 15. 'Internal stress' indicates the internal stress (MPa) of the pole layer 15. 'Anisotropic magnetic field' indicates the anisotropic magnetic field (A/m) in the pole layer 15. Numerals 1 to 6 in the boxes of 'state of magnetization' correspond to the first to sixth examples of the state of magnetization in the end face of the track width defining portion 15A shown in FIG. 8 to FIG. 13, respectively. 'Normalized signal intensity' indicates the smallest value of the normalized signal intensity (%) obtained for sectors of a single track as a result of the pole erase test.

TABLE 1

| Sample | Magnetostriction Constant | Internal stress | Anisotropic magnetic field | State of Magnetization | Normalized signal intensity |
|---|---|---|---|---|---|
| Example 1 | $40 \times 10^{-6}$ | 420 | $8.0 \times 79.6$ | 1 | 98 |
| Example 2 | $30 \times 10^{-6}$ | 210 | $100 \times 79.6$ | 2 | 98 |
| Example 3 | $45 \times 10^{-6}$ | 450 | $35 \times 79.6$ | 3 | 98 |
| Example 4 | $6 \times 10^{-6}$ | 180 | $20 \times 79.6$ | 4 | 100 |
| Example 5 | $12 \times 10^{-6}$ | 400 | $5.0 \times 79.6$ | 4 | 99 |
| Reference 1 | $40 \times 10^{-6}$ | 120 | $8.0 \times 79.6$ | 5 | 65 |
| Reference 2 | $45 \times 10^{-6}$ | −100 | $25 \times 79.6$ | 6 | 52 |

As shown in the table, Example 1 satisfies the first condition, each of Examples 2 and 3 satisfies the second condition, and each of Examples 4 and 5 satisfies the third condition. References 1 and 2 satisfy none of the first to third conditions. In addition, as shown in the table above, in each of References 1 and 2 the normalized signal intensity is small, which indicates that pole erase occurred. In contrast, in each of Examples 1 to 5, the normalized signal intensity is 98% or greater, which indicates that no pole erase occurred. As can be seen from the foregoing results of the experiment, the embodiment of the invention makes it possible to suppress the occurrence of pole erase without making the structure of the pole layer 15 complicated.

Figure 4:
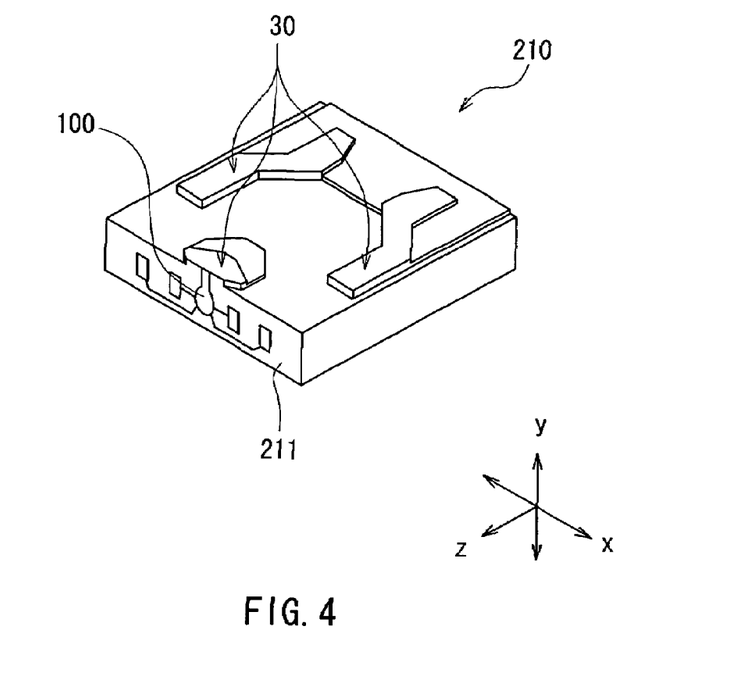
FIG. 4 is a perspective view illustrating a slider that a head gimbal assembly of the embodiment of the invention includes.

A head gimbal assembly, a head arm assembly and a magnetic disk drive of the embodiment will now be described. Reference is made to FIG. 4 to describe a slider 210 incorporated in the head gimbal assembly. In the magnetic disk drive the slider 210 is placed to face toward a magnetic disk platter that is a circular-plate-shaped recording medium to be driven to rotate. The slider 210 has a base body 211 made up mainly of the substrate 1 and the protection layer 22 of FIG. 1. The base body 211 is nearly hexahedron-shaped. One of the six surfaces of the base body 211 faces toward the magnetic disk platter. The medium facing surface (air bearing surface) 30 is formed in this one of the surfaces. When the magnetic disk platter rotates in the z direction of FIG. 4, an airflow passes between the magnetic disk platter and the slider 210, and a lift is thereby generated below the slider 210 in the y direction of FIG. 4 and exerted on the slider 210. The slider 210 flies over the magnetic disk platter by means of the lift. The x direction of FIG. 4 is across the tracks of the magnetic disk platter. A thin-film magnetic head 100 of the embodiment is formed near the air-outflow-side end (the end located at the lower left of FIG. 4) of the slider 210.

Figure 5:
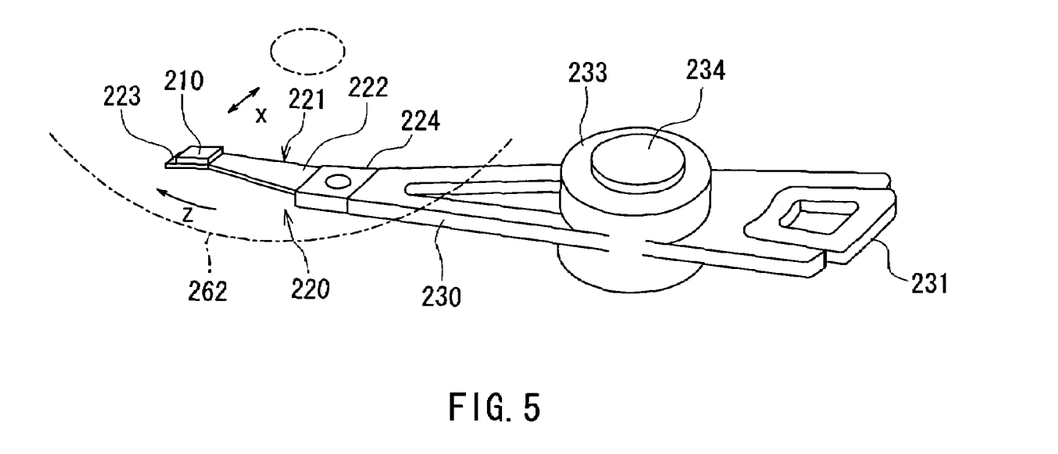
FIG. 5 is a perspective view illustrating a head arm assembly of the embodiment of the invention.

Reference is now made to FIG. 5 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly comprising the arm 230 and the head gimbal assembly 220 attached to the arm 230 is called a head arm assembly. An assembly comprising a carriage having a plurality of arms wherein the head gimbal assembly 220 is attached to each of the arms is called a head stack assembly.

FIG. 5 illustrates the head arm assembly of the embodiment. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 6:
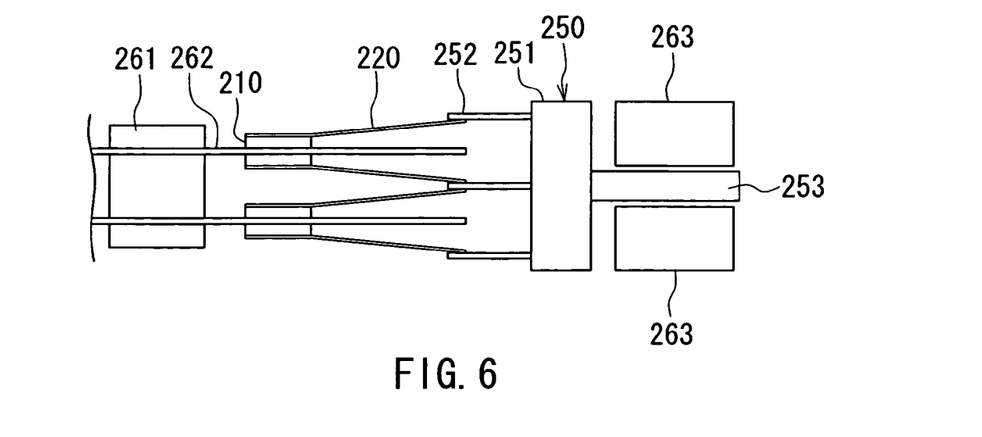
FIG. 6 is a view for illustrating a main part of a magnetic disk drive of the embodiment of the invention.
Figure 7:
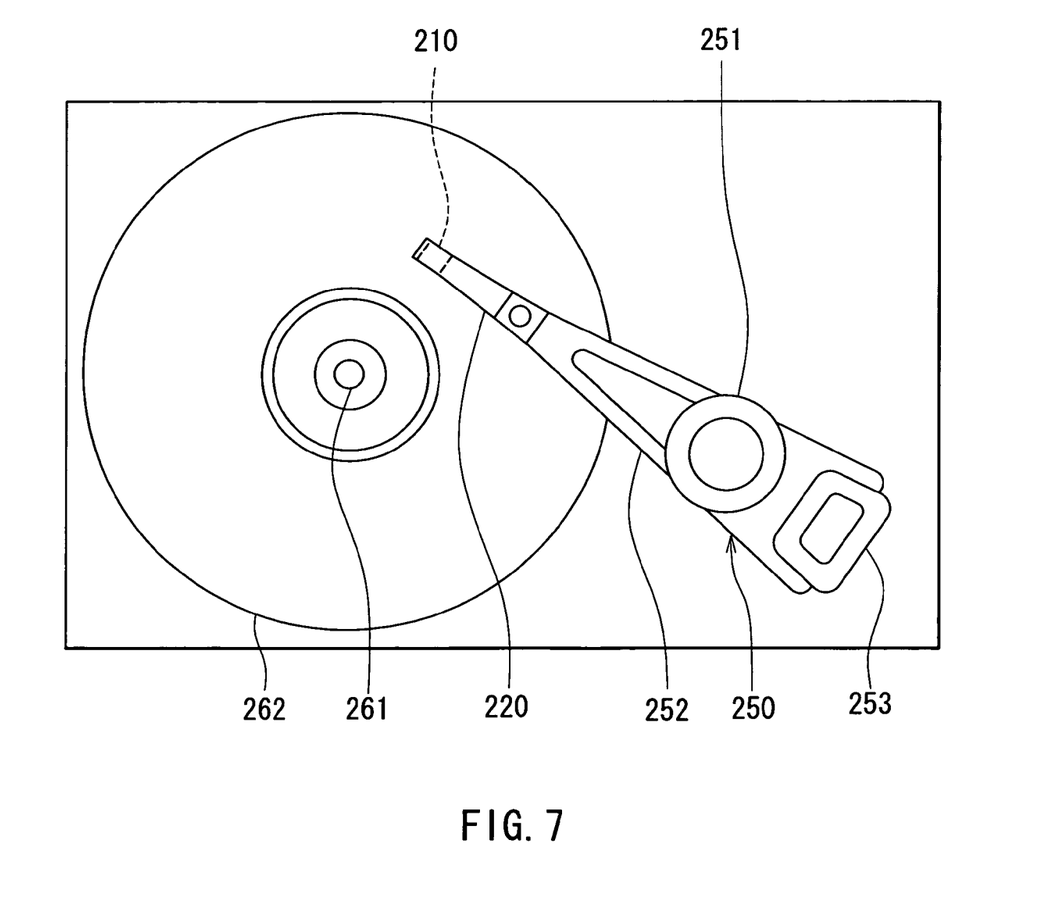
FIG. 7 is a top view of the magnetic disk drive of the embodiment of the invention.

Reference is now made to FIG. 6 and FIG. 7 to describe an example of the head stack assembly and the magnetic disk drive of the embodiment. FIG. 6 is a view for illustrating the main part of the magnetic disk drive. FIG. 7 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the magnetic disk platters 262.

In the magnetic disk drive of the embodiment the actuator moves the slider 210 across the tracks of the magnetic disk platter 262 and aligns the slider 210 with respect to the magnetic disk platter 262. The magnetic head incorporated in the slider 210 writes data on the magnetic disk platter 262 through the use of the write head and reads data stored on the magnetic disk platter 262 through the use of the read head.

The head gimbal assembly, the head arm assembly and the magnetic disk drive of the embodiment exhibit effects similar to those of the magnetic head of the embodiment described previously.

The present invention is not limited to the foregoing embodiment but may be practiced in still other ways. For example, while the magnetic head disclosed in the embodiment has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:

a medium facing surface that faces toward a recording medium;

a coil for generating a magnetic field corresponding to data to be written on the recording medium; and a pole layer allowing a magnetic flux corresponding to the field generated by the coil to pass therethrough, and generating a write magnetic field for writing the data on the recording medium by means of a perpendicular magnetic recording system, wherein:

the pole layer incorporates a track width defining portion and a wide portion that is located away from the medium facing surface and coupled to the track width defining portion;

the track width defining portion has an end face that is located in the medium facing surface and that defines a track width;

a maximum width of the wide portion is greater than the track width and equal to or greater than a length of the wide portion taken in a direction orthogonal to the medium facing surface;

the pole layer is made of a magnetic material and does not include any nonmagnetic layer inside; and when the coil is generating no magnetic field, in the end face of the track width defining portion, there exist a first region and a second region in which directions of components of magnetization orthogonal to the medium facing surface are opposite.

2. The magnetic head according to claim 1, wherein, in the end face of the track width defining portion, there further exists a third region that has no component of magnetization in the direction orthogonal to the medium facing surface.

3. The magnetic head according to claim 1, wherein each of the first and second regions has an area that is equal to or smaller than two thirds of an area of the end face of the track width defining portion.

4. The magnetic head according to claim 1, wherein that track width falls within a range of 0.05 to 0.15 µm inclusive, and a length of the track width defining portion taken in the direction orthogonal to the medium facing surface falls within a range of 10 to 250 nm inclusive.

5. The magnetic head according to claim 1, wherein:

a magnetostriction constant of a material forming the pole layer is greater than or equal to $10 \times 10^{-6}$ and smaller than $50 \times 10^{-6}$;

an internal stress of the pole layer is a tensile stress that is greater than or equal to 200 MPa and smaller than or equal to 1000 MPa; and an anisotropic magnetic field in the pole layer is greater than or equal to 0 A/m and smaller than 30×79.6 A/m.

6. The magnetic head according to claim 1, wherein:

a magnetostriction constant of a material forming the pole layer is greater than or equal to $10 \times 10^{-6}$ and smaller than $50 \times 10^{-6}$;

an internal stress of the pole layer is a tensile stress that is greater than or equal to 200 Mpa and smaller than or equal to 1000 MPa; and an anisotropic magnetic field in the pole layer is greater than or equal to 30×79.6 A/m and smaller than or equal to 200×79.6 A/m.

7. The magnetic head according to claim 1, wherein:

a magnetostriction constant of a material forming the pole layer is greater than or equal to zero and smaller than $15 \times 10^{-6}$;

an internal stress of the pole layer is a tensile stress that is greater than or equal to 100 MPa and smaller than or equal to 1000 MPa; and an anisotropic magnetic field in the pole layer is greater than or equal to 0 A/m and smaller than 30×79.6 A/m.

8. A head gimbal assembly comprising: a slider including a magnetic head for perpendicular magnetic recording and disposed to face toward a recording medium; and a suspension flexibly supporting the slider, wherein:

the magnetic head comprises:

a medium facing surface that faces toward the recording medium;

a coil for generating a magnetic field corresponding to data to be written on the recording medium; and a pole layer allowing a magnetic flux corresponding to the field generated by the coil to pass therethrough, and generating a write magnetic field for writing the data on the recording medium by means of a perpendicular magnetic recording system, wherein:

the pole layer incorporates a track width defining portion and a wide portion that is located away from the medium facing surface and coupled to the track width defining portion;

the track width defining portion has an end face that is located in the medium facing surface and that defines a track width;

a maximum width of the wide portion is greater than the track width and equal to or greater than a length of the wide portion taken in a direction orthogonal to the medium facing surface;

the pole layer is made of a magnetic material and does not include any nonmagnetic layer inside; and when the coil is generating no magnetic field, in the end face of the track width defining portion, there exist a first region and a second region in which directions of components of magnetization orthogonal to the medium facing surface are opposite.

9. A head arm assembly comprising: a slider including a magnetic head for perpendicular magnetic recording and disposed to face toward a recording medium; a suspension flexibly supporting the slider; and an arm for making the slider travel across tracks of the recording medium, the suspension being attached to the arm, wherein:

the magnetic head comprises:

a medium facing surface that faces toward the recording medium;

a coil for generating a magnetic field corresponding to data to be written on the recording medium; and a pole layer allowing a magnetic flux corresponding to the field generated by the coil to pass therethrough, and generating a write magnetic field for writing the data on the recording medium through the use of a perpendicular magnetic recording system, wherein:

the pole layer incorporates a track width defining portion and a wide portion that is located away from the medium facing surface and coupled to the track width defining portion;

the track width defining portion has an end face that is located in the medium facing surface and that defines a track width;

a maximum width of the wide portion is greater than the track width and equal to or greater than a length of the wide portion taken in a direction orthogonal to the medium facing surface;

the pole layer is made of a magnetic material and does not include any nonmagnetic layer inside; and when the coil is generating no magnetic field, in the end face of the track width defining portion, there exist a first region and a second region in which directions of components of magnetization orthogonal to the medium facing surface are opposite.

10. A magnetic disk drive comprising: a slider including a magnetic head for perpendicular magnetic recording and disposed to face toward a recording medium that is driven to rotate; and an alignment device supporting the slider and aligning the slider with respect to the recording medium, wherein:

the magnetic head comprises:

a medium facing surface that faces toward the recording medium;

a coil for generating a magnetic field corresponding to data to be written on the recording medium; and a pole layer allowing a magnetic flux corresponding to the field generated by the coil to pass therethrough, and generating a write magnetic field for writing the data on the recording medium through the use of a perpendicular magnetic recording system, wherein:

the pole layer incorporates a track width defining portion and a wide portion that islocated away from the medium facing surface and coupled to the track width defining portion;

the track width defining portion has an end face that is located in the medium facing surface and that defines a track width;

a maximum width of the wide portion is greater than the track width and equal to or greater than a length of the wide portion taken in a direction orthogonal to the medium facing surface;

the pole layer is made of a magnetic material and does not include any nonmagnetic layer inside; and when the coil is generating no magnetic field, in the end face of the track width defining portion, there exist a first region and a second region in which directions of components of magnetization orthogonal to the medium facing surface are opposite.

* * * * *